United States Patent [19]

Anestis et al.

[11] Patent Number: 4,623,503
[45] Date of Patent: Nov. 18, 1986

[54] SLUSH MOLDING METHOD WITH SELECTIVE HEATING OF MOLD BY AIR JETS

[75] Inventors: Emmanuel Anestis, Raymond; Frederick I. Wakefield, Durham, both of N.H.

[73] Assignee: Ex-Cell-O Corporation, Troy, Mich.

[21] Appl. No.: 673,810

[22] Filed: Nov. 21, 1984

[51] Int. Cl.$^4$ .................. B29C 39/00; B29C 41/18
[52] U.S. Cl. .................. 264/302; 264/327; 264/DIG. 60
[58] Field of Search ............ 264/327, DIG. 60, 302, 264/310, 245

[56] References Cited

U.S. PATENT DOCUMENTS

| | | | |
|---|---|---|---|
| 2,588,571 | 3/1952 | Porter | 264/302 |
| 2,939,180 | 6/1960 | Hickler et al. | 264/302 |
| 3,002,230 | 10/1961 | Stewart | 264/46.6 |
| 3,125,619 | 3/1964 | Miller | 264/327 |
| 3,315,016 | 4/1967 | Wersosky et al. | 264/15 |
| 3,680,629 | 8/1972 | Gaudreau | 165/26 |
| 3,728,429 | 4/1973 | Colby et al. | 264/302 |
| 4,038,123 | 7/1977 | Sammis | 264/DIG. 60 |
| 4,217,325 | 8/1980 | Colby | 264/245 |
| 4,357,381 | 11/1982 | Wilson | 264/327 |

Primary Examiner—Willard E. Hoag
Attorney, Agent, or Firm—John C. Evans

[57] ABSTRACT

A method wherein an article is molded of a heat-fusing material or plastisol, either liquid or dry, in a mold having an array of gas impingement jets disposed adjacent the backside of a mold surface for controlling the temperature over respective first and second areas of the mold surface. There is included first and second gas heating and cooling circuits each including a blower and dampers for supplying gas at the gas impingement jets associated with the mold. All of the gas impingement jets are supplied with heated gas to preheat the mold surface to a non-gelling temperature and a liquid plastisol coating is applied to the mold surface. To obtain the coating, the mold is filled and the excess plastisol is removed from the mold by dumping the plastisol from the mold into a dump tank. In a liquid plastisol process, a first group of gas jets arranged in close proximity to the mold maintain a temperature higher than the temperature of the liquid in the first area of the mold to a higher temperature than the second area.

1 Claim, 6 Drawing Figures

SLUSH MOLDING METHOD WITH SELECTIVE HEATING OF MOLD BY AIR JETS

BACKGROUND OF THE INVENTION (1) Field of the Invention

This invention relates to a method and an assembly for practicing the method of molding hollow thin-walled articles from a heat-fusing material such as vinyl plastisol by slush molding.

Various vinyl plastisol compositions are known and used in various slush molding methods in various assemblies for performing those methods. Typically, an open hollow mold is filled with liquid plastisol or covered by dry plastisol and heat is applied to the mold surface and transferred to the liquid or dry plastisol to gell a layer of plastisol adjacent the mold surface. The thickness of the gelled layer depends upon the temperature to which the plastisol layer is subjected and the time the plastisol is maintained at that temperature. After the layer adjacent the mold surface is gelled, the ungelled plastisol is dumped or poured out of the mold.

(2) Description of the Prior Art

In one well-known method, the mold temperature is maintained relatively low to prevent gelling as a very thin initial layer or coating of plastisol is applied to the mold to prevent bare spots and to prevent the entrapment of air bubbles, thereby providing a thin coating which strictly conforms to the mold configuration. Such a coating is applied by filling and emptying the mold. For example, automotive dashboard or instrument panel covers are made in this fashion and the molds frequently include details to define imitation stitching in the finished product as well as undercuts and other intricate detail. The very thin coating is first applied to conform to the mold and to prevent irregularities in the outer surface of the finished product. After this very thin coating is applied, the mold is again filled with additional plastisol and the entire mold is heated to gel the plastisol and increase the thickness of the finished product. After the desired thickness is attained, the mold is again dumped or emptied and thereafter the mold is subjected to additional heat for curing the product.

An example of such a method and an assembly for practicing same is shown in the U.S. Pat. No. 3,728,429 granted to Daniel E. Colby, Philip E. Rogers and Frederick J. Sliwinski on Apr. 17, 1973 and assigned to the assignee of the subject invention. That patent discloses such a method for slush molding articles wherein the mold is heated by the exterior surfaces thereof being exposed to impinging streams of hot gas and, after the product is finished, the mold is cooled by being subject to cooling water from water spray nozzles, after which the fused finished article is stripped from the mold. In addition, an endless conveyor moves a plurality of molds through various stations in the performance of the method. Although the method and assembly shown in this patent have proven to be very satisfactory, there are disadvantages such as the open flame adjacent the molds, which produces the hot gas for heating of the molds, and the use of water or liquid for cooling the molds and which can be incompatible with the plastisol. Further, the assembly, because of its long conveyor and multiple molds, is suited for long runs of a plastisol of a particular color but is not well suited for short runs or quick or efficient changeovers.

Other methods of heating in a slush molding process have been utilized in the prior art; for example, the molds may be moved through heating ovens as exemplified in U.S. Pat. No. 3,002,230 granted to J. W. Stewart on Oct. 3, 1961. Alternatively, the molds may be subjected to induction heaters as exemplified in U.S. Pat. No. 3,315,016 granted to John M. Wersosky and Donald A. Moore on Apr. 18, 1967 and assigned to the assignee of the subject invention. Another method for heating the mold is exemplified in U.S. Pat. No. 3,680,629 granted to Laurent R. Gaudreau and Floyd E. McDowell on Aug. 1, 1972 and assigned to the assignee of the subject invention. That patent teaches the heating of a mold by incorporating tubes in the mold and flowing a heated fluid such as steam through the tubes for heating the mold. It is also known in the slush molding art to heat the mold by such tubes for conveying liquid through the mold wherein there are multiple circuits of the tubes with each circuit having an inlet and an outlet, but with each circuit subjected to the same fluid medium, i.e., the same temperature.

One of the problems associated with the prior art methods is that in many articles which are manufactured by slush molding where the mold is filled with plastisol, some areas of the filled mold are at a lower liquid level of the plastisol and are salvage or trim areas which are not used in the final product and therefore do not require the thickness of the other finished areas in the product. Yet, when the entire mold surface is heated uniformly the entire finished article has approximately the same thickness even though some areas are trim or non-usable. There is known in the slush molding art the technique of varying the thickness by heating different areas of the mold to a higher degree to increase the thickness of the article in certain areas. Such a technique is exemplified in U.S. Pat. No. 2,588,571 granted to Sydney Porter on Mar. 11, 1952. That patent discloses the technique of slush molding a boot by utilization of infrared lamp heating and shielding the heating from certain portions of the mold to prevent the build-up of the plastisol thickness and to increase the thickness of the sole of the boot by increased heating.

The subject invention provides an improved method and assembly for performing the method of controlling the thickness of an article made by the slush molding process in a mold having first and second groups of liquid passages disposed adjacent the mold surface for controlling the temperature overrespective first and second areas of the mold surface as set forth in U.S. Pat. No. 4,217,325 granted to D. E. Colby on Aug. 12, 1980 with a common assignee. The first group of liquid passages are disposed adjacent the first area of the mold surface where it is desired to increase the thickness of the finished article whereas the second group of passages is disposed adjacent the second area of the mold surface where the material in the finished article is scrapped and/or will be trimmed and therefore the desired thickness is desirably less. Both the first and second groups of passages are supplied with liquid to maintain the temperature of the first and second areas of the mold surface at a non-gelling temperature as liquid plastisol is disposed over the mold surface to define a coating or layer. This very thin coating of plastisol is applied to be free of surface blemishes. Thereafter, additional liquid plastisol is provided for increasing the thickness only over the first area of the mold surface. To accomplish this, the first group of passages is supplied with a liquid at a temperature higher than the non-gelling temperature of the liquid in the second group of passages for heating the first area of the mold surface to a higher temperature than the second area so as to gel the liquid plastisol over the first area of the mold surface which is heated with the heat supplied by the liquid in the first group of passages. After the desired gelled thickness is attained, all passages are supplied with liquid at a temperature sufficient to heat the first and second areas of the mold to a cure temperature for curing all of the plastisol. Accordingly, the finished article will have a greater thickness over the first area which defines the finished area of the article whereas the thickness of the article over the second area of the mold surface will be much thinner and define the scrap or trim areas. Consequently, significant amounts of material are saved.

While the method and apparatus of U.S. Pat. No. 4,217,325 solves the material waste problem, the first and second groups of passages are in the form of tubes brazed to the back side of the mold. Such mold and tube combinations are expensive to fabricate. Also, the mold itself is an electro-formed nickel mold that may be weakened during the fabrication of the tool. Also, repeated thermal stresses produced in the mold during production cycling may produce premature mold failures.

SUMMARY OF THE INVENTION

The subject invention provides an improved method and assembly for performing the method of controlling the thickness of an article made by the slush molding process in a mold having first and second impingement jet distribution means and a gas heating and cooling system for controlling the temperature over respective first and second areas of the mold surface. The first group of impingement jets are disposed adjacent the first area of the mold surface where it is desired to increase the thickness of the finished article whereas the second group of impingement jets is disposed adjacent the second area of the mold surface where the material in the finished article is scrapped and/or will be trimmed and therefore the desired thickness is desirably less. Both the first and second groups of impingement jets are supplied with gas from a common inlet plenum to maintain the temperature of the first and second areas of the mold surface at a non-gelling temperature as plastisol is disposed over the mold surface to define a coating or layer. This very thin coating of plastisol is applied to be free of surface blemishes. Thereafter, additional plastisol is provided for increasing the thickness only over the first area of the mold surface. To accomplish this, the first group of impingement jets heats the first area of the mold surface to a higher temperature than the second area so as to gel the plastisol over the first area of the mold surface which is heated with the heat supplied by the liquid in the first group of passages. The impingement heating avoids the need for expensive mold fabrication and excessive thermal stressing of a mold during production cycles while enabling selective control of mold heating that produces thinner thickness in the molded article at the second region which is scrap or trim areas of the molded article.

PRIOR ART STATEMENT

The U.S Pat. No. 3,728,429 discussed above discloses a slush molding process wherein the mold is heated by being subjected to hot gases and cooled by being subjected to cooling water and wherein the molds move on an endless conveyor through various stations. There is no suggestion in that patent of the subject inventive concept of utilizing first and second groups of gas jets for differential heating of the mold for controlling the thickness of the article formed therein to avoid excessive material waste at scrap or trim points on the mold. Furthermore, there is no suggestion of utilizing a hot and cold gas distribution system as suggested by the subject invention wherein a mold is heated and cooled by gas flow through an inlet plenum of the mold which supplies both sets of jets and wherein the mold includes a return plenum thereon. The above-mentioned U.S. Pat. No. 3,680,629 suggests the use of liquid passages adjacent the mold surface for controlling the temperature of the mold, however, there is no suggestion in that patent of using first and second sets of impingement jets arranged to produce different temperatures at first and second regions of a mold. As alluded to above in regard to U.S. Pat. No. 2,588,571, the technique of varying the thickness by differential heating is known in the slush molding art, however, such is accomplished by infrared heating. There has been no recognition in the prior art of the advantages of differentially heating and cooling the surfaces of the mold used in the slush molding process by utilizing different groups of impingement jets adjacent the mold surface and a control means for sequentially supplying those jets with gas flow at different temperatures. Other processes using hot gas to mold plastic parts are set forth in U.S. Pat. Nos. 3,578,066; 3,590,435; 3,492,307; 3,416,913 and 3,388,429. However, none of the processes use the impingement jet method of heat distribution of the present invention.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
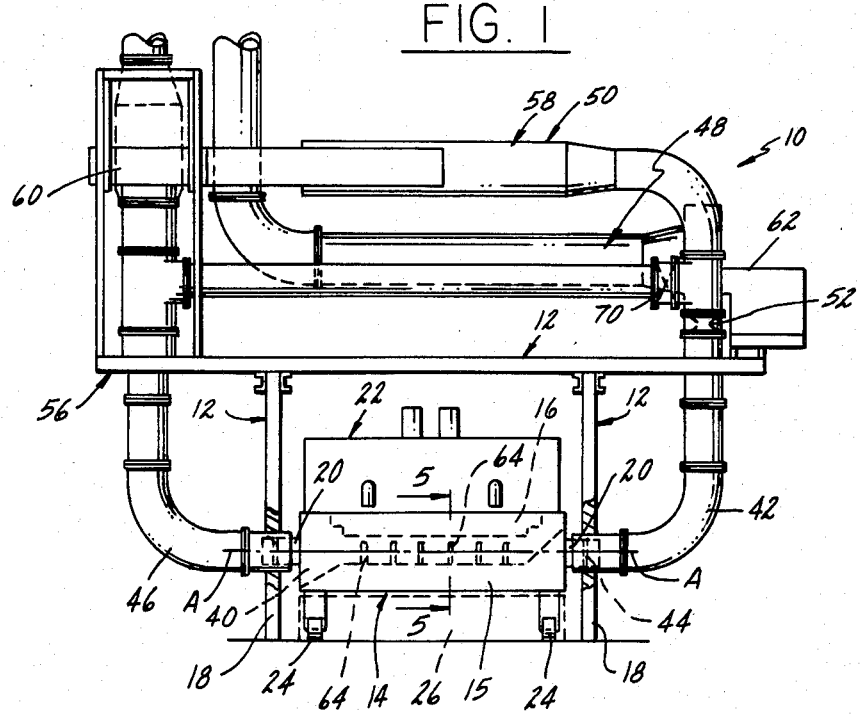
FIG. 1 is a diagrammatic view of a preferred embodiment of an assembly constructed in accordance with the subject invention.

FIG. 1 shows an assembly generally indicated at 10 and constructed in accordance with the subject invention. The assembly 10 includes a stationary pedestal generally indicated at 12 for rotatably supporting a mold support means generally indicated at 14. The pedestal 12 rotatably supports the mold support means for rotation about the axis A—A. The mold support means 14 includes a box structure 15 which receives and supports a mold 16. The mold 16 has a mold cavity defining a mold surface.

The pedestal 12 is stationary and includes spaced support legs 18. The support legs 18 rotatably support the mold support means 14 through large circular bearings (not shown) disposed on collars or sleeves 20, which collars or sleeves 20 have accesses or openings through the center thereof, the purpose of which will be explained hereinafter. Suitable drive means for the mold support means 14 are set forth in U.S. Pat. No. 4,217,325 issued Aug. 12, 1980 which is incorporated herein by reference.

The assembly 10 also includes a movable modular unit generally shown at 22 for supplying liquid heat-fusing material such as plastisol to the open mold 16. The entire unit 22 is supported on a plurality of rollers 24 and includes a dump tank 26. The dump tank 26 is movable with the entire unit 22 and is normally disposed under the mold support means 124 when the unit 22 is in the operating position illustrated in FIG. 1 relative to the pedestal 12 for receiving plastisol emptied from the mold 16 as the mold 16 is rotated for dumping or emptying into the dump tank 26. As alluded to above, the mold 16 may be supplied with a different plastisol or the same plastisol of a different color merely by moving the modular unit 22 away from the mold and inserting or placing a different modular unit in position having a different plastisol. Further, and as will become clear hereinafter, the preferred embodiment of the unit 22 includes two modules for supplying two different plastisols whereby two different plastisols may be seqentially supplied to the mold. This can result in a continuous production cycle utilizing a particular mold 16 to make the same product or article of different colors.

The modular unit 22 is a plastisol supply and retrieval module for supplying liquid plastisol to the mold surface of the mold 16 and for retrieving liquid plastisol emptied or dumped from the mold 16. The rollers 24 define a conveyance means for facilitating the movement of the unit 22 away from the pedestal 12 and the mold support means 14.

Figure 4:
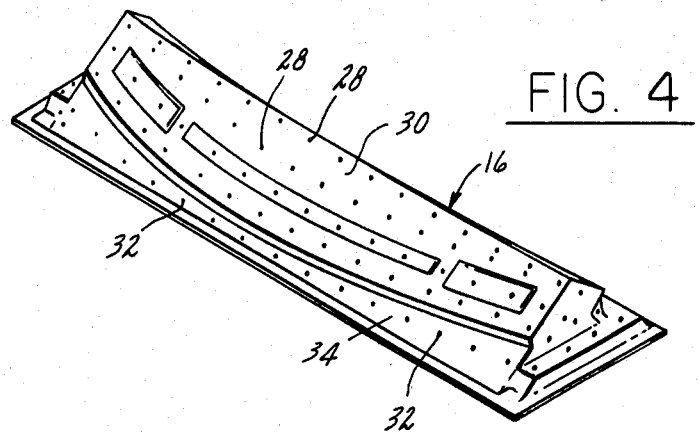
FIG. 4 is a perspective view of the backside of a mold showing an air jet impingement array utilized with the subject invention.

As best shown in FIG. 4, the mold 16 has a molding surface on the interior thereof which must be heated for the plastisol to gel. A first group of air impingement jets 28 is disposed adjacent the mold surface over a first area 30 of the mold backside of mold 16 for controlling the temperature over the first area 30 of the mold surface. Additionally, a second group of air impingement jets 32 is disposed adjacent the mold backside surface over a second area 34 of the mold surface for controlling the temperature over the second area 34.

A first manifold means 36, including an inlet plenum 38 and a return plenum 40, is supported by the mold support means for distributing gas to and collecting gas from the air impingement jets 28,32. More specifically, air inlet plenum 38 is disposed at the bottom of the mold support means 14. Inlet fluid conduit 42 passes through seal 44 at sleeve 20 to supply the inlet plenum 38. An outlet conduit 46 passes through a like seal to communicate with return plenum 40. Inlet conduit 42 is connected to hot and cold air systems 48,50 through regulating damper valves 52,54, respectively.

The air systems 48,50 are loop systems. An I-beam frame 56 supports propane gas burner 58 with a combustion air blower 59 and fuel supply 61. Hot and cold air blowers 60,62, the dampers 52,54 and the appropriate ductwork are also supported by frame 56. The mold box, supported by rotary joints at each end, bears the electroform mold 16 in the same manner as in U.S. Pat. No. 4,217,325 and is designed to accommodate a variety of molds.

A certain condition must exist between the hot air flow and the mold surface 32 in order to produce the necessary heat-up rates and mold temperatures during the heating cycle. Convective heat transfer coefficients are achieved by forcing the hot air to impinge the back surface of the electroform in a uniform pattern (see FIG. 4). The convective heat transfer coefficients resulting from this pattern are relatively equal across the entire mold surface 32, thus producing uniform heating.

Figure 5:
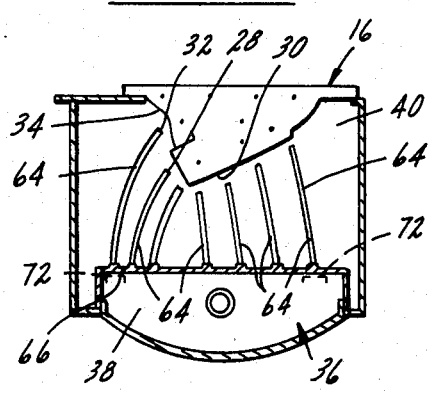
FIG. 5 is a typical sectional view of the mold box arrangement of the present invention.

Round copper tubes 64 of a specific diameter and length are attached to an air plenum plate 66 inside the mold box 15 and are positioned perpendicularly to the mold surface at a calculated distance (see FIG. 5). A high velocity jet of air is produced as air passes from the tube or nozzle and such multiple impinging flow devices allow for short flow paths on the surface of the mold and, therefore, relatively high heat transfer rates. The air flow rate, air temperature, the nozzle diameters, their spacings, and their distance to the mold surface areas 30,34 are the main variables which can be adjusted to solve any heat transfer problem and which produce selective heating of mold areas 30,34.

A thermocouple or thermistor is associated with the mold surface 32 of the mold 16 and when the mold surface reaches approximately 150° the dampers 52,54 are closed and the mold support means 14 is rotated to dump or empty the mold 16 into the dump tank 30. When the first and second areas 30 and 36 of the mold surface are heated to a range of approximately 130° F. to 150° F. a thin coating is applied over the mold surface. This coating or layer is actually applied as the mold 16 is filled and emptied of plastisol, as some of the liquid plastisol covers the mold surface or flows into the intricacies thereof during the emptying motion. After the mold is emptied, it is returned to the upright position. A limit switch is associated with the mold support means to provide a signal when the mold support means is returned to the upright position illustrated in FIG. 1. When the mold support means returns to the upright position, the solenoid-actuated damper 52 is open and a recirculating damper 70 is closed to supply hot air through the manifold 38 and to the jets 28 for heating the first areas 30 of the mold surface. The air is approximately 600° F. and heats the first areas 30 of the mold surface to a range of 250° F. to 260° F. as the mold is refilled or additional plastisol is placed in the mold for gelling the plastisol in the first areas 30 of the mold surface. Combustion air expansion produced during the process is dumped via duct 71.

The temperature of the mold surface in the second area 34 is held at a non-gelling temperature, for example, by use of baffle plate means 72, interposed as shown in dotted lines in FIG. 5, to restrict flow to the waste areas during gelation. Another thermocouple provides a signal when the mold surface temperature is approximately 250° F. to provide a signal for pouring the additional plastisol into the mold 16. It will be appreciated by those skilled in the art that the temperature of the first areas may be raised for gelling before or during or after the filling of the mold depending upon the design of the mold and other factors. A timer may be provided to provide a predetermined time the plastisol is subjected to the 250° temperature of the mold for providing a predetermined thickness in the article before the mold support means 14 is again rotated for emptying the additional plastisol into the dump tank 30. When the mold support means 14 is rotated back to the upright position, dampers 52,72 are opened to supply the 600° F.

air through both jets 28,34 so the mold surface temperature in all areas reaches a range of 350° F. to 400° F. for gelling the plastisol over the second areas and curing or fusing the entire finished plastisol article over both the first and second areas. After the curing, the mold support means rotates to a position where the mold faces outwardly or is in a generally perpendicular position, damper 52 is closed and damper 70 is opened to allow recirculation. Damper 54 is opened to supply cool air through jets 28,34 for cooling the mold surface whereby the article may be manually stripped from the mold.

The assembly as a whole is quite flexible due to the wide operating ranges of its components. Air temperature will be kept at a constant 600° F. by propane gas burner 58 with a nominal firing rate of 500,000 BTU/hr. and capable of a maximum 1,000,000 BTU/hr. Depending on mold size and required heat input, the hot and cold air blowers 60,62 can be adjusted as needed from 3500 to 9000 ACFM @ 600° F. with 10" W.C. and 2400 to 7200 ACFM @ 70° F. with 10" W.C., respectively. The pneumatically controlled dampers 52,54 direct airflow and are governed by air and mold temperature as are the blowers and burner.

Figure 6:
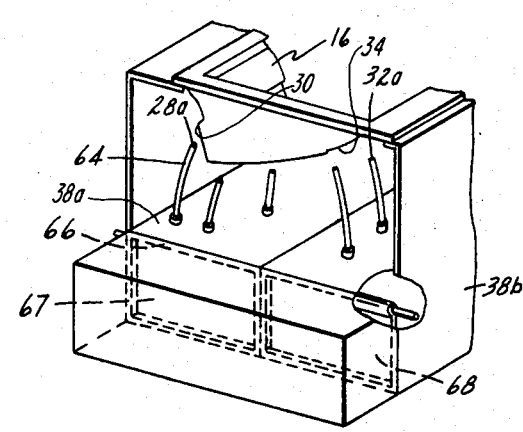
FIG. 6 is a schematic view showing a modified inlet plenum for association with the invention.

The class A surfaces and waste areas, in another embodiment, are controlled by feeding a different set of nozzles 28a, 32a shown in FIG. 6, with separate class A or waste air plenums 38a,38b respectively. Shutting of the nozzles 28a to the waste areas during gelation is controlled by a damper 67. Providing heat to only the class A surface during gelation is controlled by a damper 69 to form a definite difference in part thickness between that surface and the waste area. Supplying the two plenums (all the nozzles) with air during the fusion phase would cure both areas and result in reduced part weight. With dry plastic processes, separate plenums 38a,38b may be used to supply various levels of heat to specific mold surfaces. However, heat distribution can also be controlled by adjusting the diameters of nozzles 28a,32a, the length of tubes 64 and the spacing between the nozzles.

OPERATION OF ASSEMBLY

Figure 2:
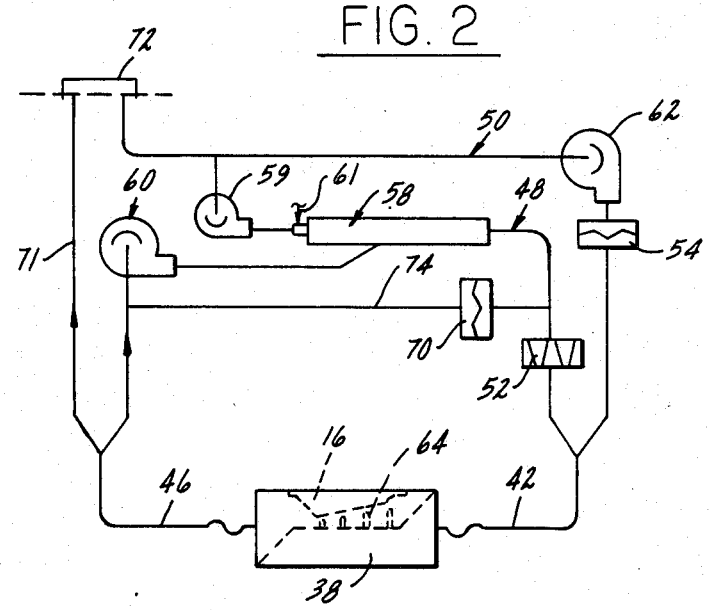
FIG. 2 is a diagrammatic view of a gas heating system for utilization with the subject invention.

During the heating phase, shown in FIG. 2, air enters the gas burner 58 from inlet roof duct 72. Circulating air from blower 60 is heated and then directed through damper 52 and conduit 42 to pass through the mold box where it transfers heat to the mold. The air that has dropped in temperature is then recirculated by the blower 60 through outlet conduit 46 to the burner 58 where it is instantly brought back up to temperature. Once the mold reaches the desired temperature, the heating phase is completed and the system enters a recirculation and cooling phase.

Figure 3:
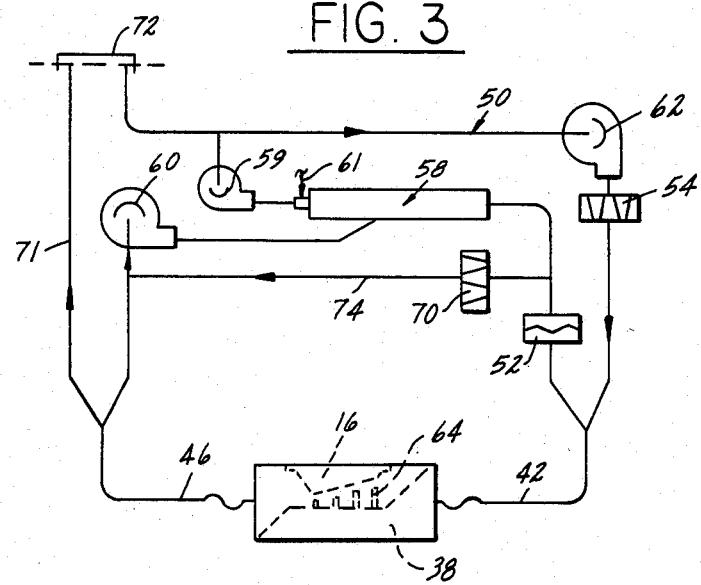
FIG. 3 is a diagrammatic view of a cooling system utilized to cool a mold in accordance with the subject invention.

During the cooling phase, and at the conclusion of the heating phase, the damper 52 is closed, burner recirculation damper 70 opens and cold air damper 54 opens and the hot air enters a recirculation mode through duct 74. In this stage, the air is continuously being circulated and kept up to temperature in an alternate loop through duct 74 by the hot air blower (see FIG. 3). The propane burner, sensing air temperature in this loop, is controlled to maintain 600° F.

During this time, ambient air from the atmosphere is drawn through the roof duct 72 by the cold air blower 62 and forced through damper 54 to pass through the mold box, cooling the mold. The air is then vented to atmosphere through duct 71. When the mold has cooled, the part is stripped and the heating phase is repeated. Air chillers could be incorporated for rapid cooling or means can be provided to inject a fine water spray to the backside of the mold during or before cooling.

In accordance with the FIG. 6 embodiment of the subject invention, air is controlled to heat or cool the first and second areas 30 and 34 of the mold surface to maintain a non-gelling temperature. To accomplish this, the mold is filled with plastisol and emptied into a dump tank. As mentioned above, the initial coating is applied to avoid surface defects in the finished product. Depending upon the mold configuration it may not always be necessary to perform this coating step. In other words, in some cases it may be possible to first gel the plastisol over the first areas while maintaining the plastisol over the second areas in a non-gelled condition. After the coating is applied, the first group of air jets 28a is supplied with hot air and the second group of air jets is closed. Additional plastisol is disposed over the coating or layer and gelled over the first area 30 of the mold which is heated with the heat supplied by the first group of jets 28a to gel a predetermined thickness of the article over the first area 30. The second group of jets 32a is maintained closed to prevent any appreciable gelling of liquid plastisol over the area 34 of the mold heated by the second group of jets 32a to prevent the build-up of gelled plastisol in those areas of the finished article where the additional thickness is not necessarily required and is often wasteful. As mentioned above, the temperature of the first area may be raised to a gelling temperature before or during or after the mold is filled with plastisol. After the mold 16 is emptied the second time when the plastisol has gelled in the first area 30 to the desired thickness, both the first and second 30 groups of air jets 28a,32a are supplied with heated air to heat the first and second areas 30 and 34 for gelling the plastisol in the second area and curing and fusing the plastisol over both the first and second areas. Although the steps of the method are distinct, they may be performed sequentially or simultaneously. In other words, heating and/or cooling of the mold may be accomplished as the plastisol is added or dumped.

As will be appreciated, by preventing the build-up of the thickness of the finished article in the waste areas of the finished article which may be trimmed or which may not be used, a great deal of plastisol may be reused and recirculated and does not end up in the finished article, thereby providing a significant savings in material costs.

The embodiments of the invention in which an exclusive property or privilege is claimed are defined as follows:

1. A method for molding a heat gellable material comprising: disposing said material on a mold in a plenum chamber having plural nozzles for directing air toward first and second outer surface portions of said mold, opening some of said nozzles to a single source of air at an elevated temperature and closing others of said nozzles to the source of air at the elevated temperature, impinging air only from said open ones of said plural nozzles against said first outer surface portion at said elevated temperature to differentially heat said first and second mold surfaces, a first portion of said surfaces being heated by air jets from said open nozzles to a temperature sufficient to gel said gellable material while the second portion of said outer mold surface is exposed only to the closed nozzles to remain at a temperature insufficient to gel said material, disposing sufficient of said gellable material in said mold to form a desired thickness of gelled material, removing ungelled material from the mold and supplying all of the nozzles with air at a temperature sufficient to raise the temperature of the mold surfaces to a cure temperature for curing the heat gellable material disposed thereover.

* * * * *